United States Patent Office 3,323,234
Patented June 6, 1967

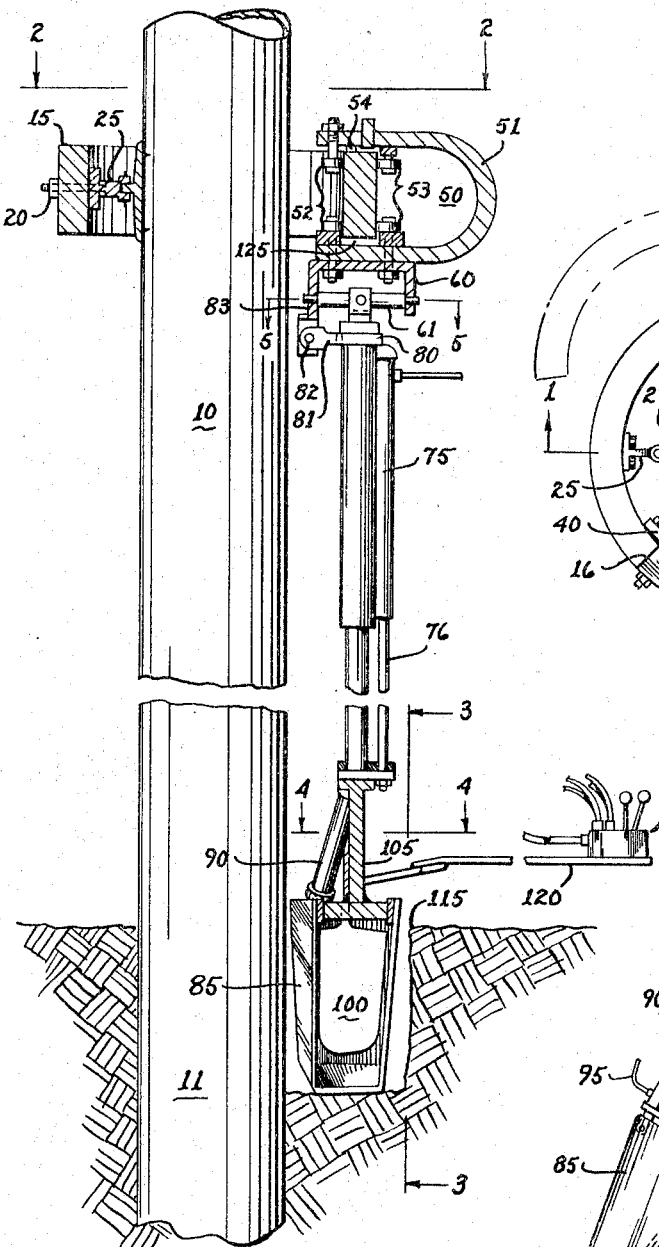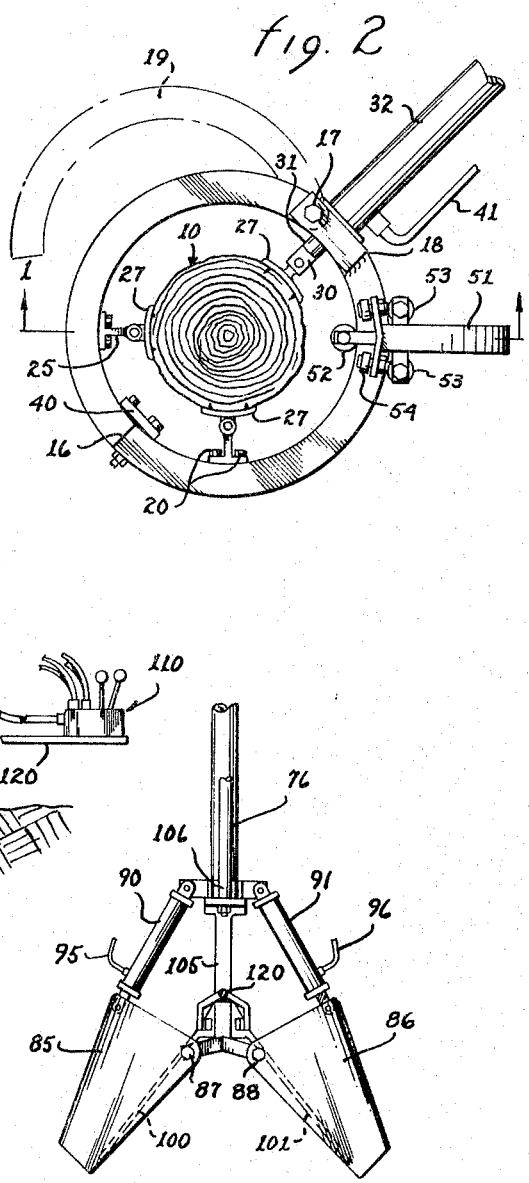
June 6, 1967     J. W. PICKRELL     3,323,234
EARTH EXCAVATING APPARATUS
Filed May 1, 1964     2 Sheets-Sheet 1
fig. 1
fig. 2
fig. 3
INVENTOR.
JOHN W. PICKRELL
BY
ATTORNEYS

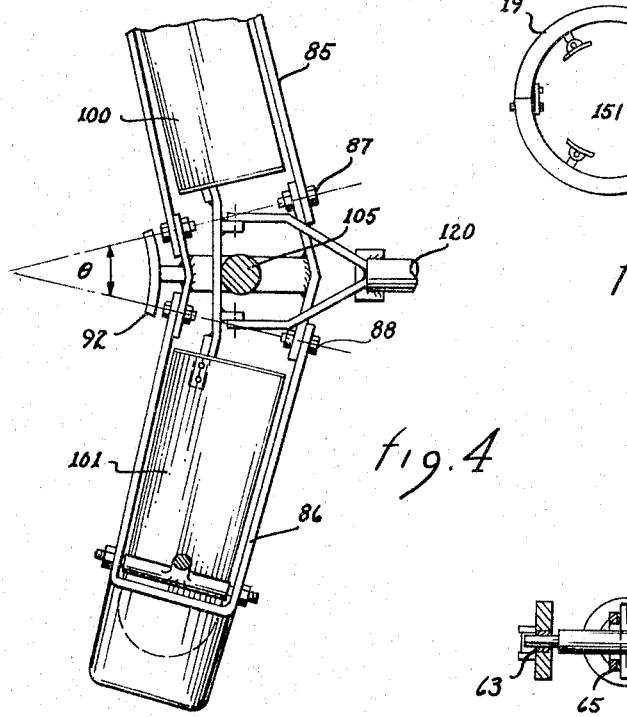
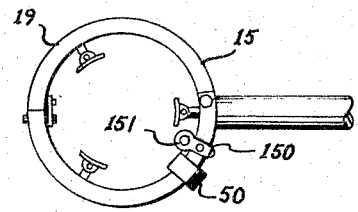
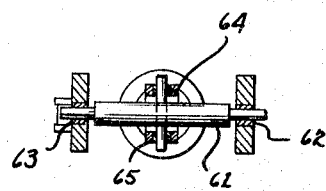
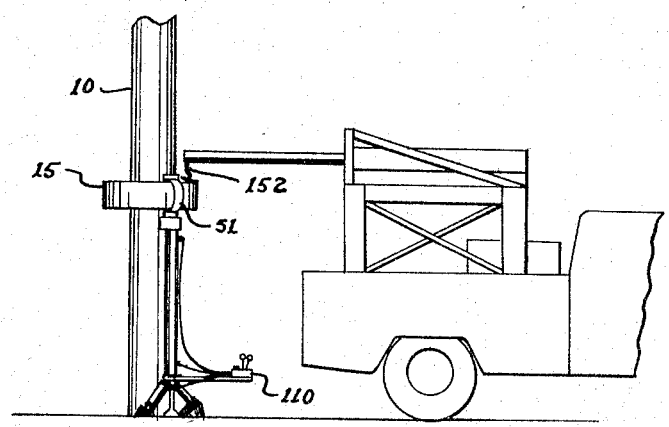

3,323,234
EARTH EXCAVATING APPARATUS
John W. Pickrell, 6237 E. Monterey Way,
Scottsdale, Ariz. 85251
Filed May 1, 1964, Ser. No. 364,254
9 Claims. (Cl. 37—103)

The present invention pertains to earth excavating apparatus, and more particularly, to a device for removing earth from around the base of an earth-embedded post such as a utility pole.

When wooden posts are placed in the ground, the posts are usually pre-treated to prevent insect damage and reduce the rate of deterioration caused by contact between the post and the earth. Utility poles are commonly heavily treated with chemicals to prolong their useful life and to retard deterioration and insect damage, however, the expense involved in replacing telephone poles that have deteriorated, even though pre-treated, becomes prohibitive in view of labor cost and equipment necessary to implement the replacement. It is therefore customary to have a schedule of inspection to determine if replacement is necessary and to chemically treat the poles if the inspection indicates they are serviceable and suitable for continued use.

It has heretofore been customary to provide a work crew for scheduled maintenance of such utility poles. The crew normally excavate the earth around the base of the utility pole and the exposed portions of the poles are then chemically treated and the earth replaced. Digging around the base of the pole is a time-consuming and physically exhausting task requiring many man hours of labor. Attempts have been made to provide automatic equipment for excavating around the base of the utility poles; however, the equipment has been unsuccessful in that the amount of earth removed thereby has been excessive, the time for removing the earth has not been a substantial improvement over manual methods, and the equipment is expensive and exceedingly cumbersome especially when attempting to transport the equipment to a utility pole located remote from roads.

Accordingly, it is an object of the present invention to provide an earth excavating apparatus for removing earth from around the base of an earth-embedded post.

It is another object of the present invention to provide an earth excavating apparatus that is conveniently placed and conveniently operated while nevertheless being rugged and dependable.

It is still a further object of the present invention to provide an earth excavating apparatus that may readily be transported to a remote location for excavating around the base of a utility pole.

It is a further object of the present invention to provide an earth excavating apparatus that can conveniently remove a minimum amount of earth about the base of a utility pole while nevertheless exposing the heretofore embedded base of the pole for subsequent chemical treatment.

Further objects and advantages of the present invention will become apparent to those skilled in the art as the description thereof proceeds.

Briefly, in accordance with one embodiment of the present invention, an earth excavating apparatus is provided having a detachable track that clamps to the periphery of the utility pole at a desired distance above the ground. A carriage, riding on the track, supports an extensible means which, in the embodiment chosen for illustration, takes the form of a hydraulic piston and cylinder. The opposite end of the piston and cylinder are connected to a novel scoop arrangement which is hydraulically operated and capable of scooping earth close to the surface of the pole. The present invention may more readily be described by reference to the accompanying drawings in which:

FIGURE 1 is a side elevational view, partly in section, of an earth excavating apparatus constructed in accordance with the teachings of the present invention.

FIGURE 2 is a top view taken along line 2—2 of the apparatus of FIGURE 1.

FIGURE 3 is a side elevational view, taken along line 3—3, of the apparatus of FIGURE 1.

FIGURE 4 is a top view of the scoop of FIGURE 1 taken along 4—4 and enlarged to show the detail of the scoop.

FIGURE 5 is an enlarged view of a portion of FIGURE 1 taken along 5—5.

FIGURE 6 is a schematic illustration showing the earth excavating apparatus of the present invention as it would appear mounted on the back of a small vehicle.

FIGURE 7 shows a partial top view and a partial side elevational view of the apparatus of the present invention including a mounting strap.

Referring to the figures, a utility pole 10 is shown having a portion 11 thereof embedded in the earth. The apparatus of the present invention, in the embodiment chosen for illustration, includes a track 15 that may be constructed of aluminum, steel, or other convential relatively rigid material. The track is formed into a ring and includes a break 16 and pivot 17. The break may thus be opened, and the arcuate portion 19 of the ring opened to admit the post or utility pole 10. The track has secured thereto, such as by bolts 20, a plurality of arms 25 extending substantially radially inwardly of the track. Each arm supports a shoe 27 that is pivotal about an exis parallel to the longitudinal axis of the utility pole 10 when the apparatus of the present invention is attached to the pole. One of the arms 30 is secured to the piston 31 of a hydraulic cylinder 32. The arm 30 is thus extensible and retractable toward and away from the utility pile 10. A locking means 40, which may be any convenient means for latching the two arcuate portions 19 and 20 together, is provided in the embodiment chosen for illustration as a simple latch bolted to the arcuate portion 20 and connectable by simple latching to the arcuate portion 19. A conduit 41 provides hydraulic fluid to the cylinder 32 to force the piston 31 inward or outward of the cylinder thus causing the shoe connected to the arm 30 to contact or disengage the utility pole 10.

A carriage, indicated generally at 50, includes a mounting member 51 supporting a plurality of rollers for engaging the track 15. Rollers 52 contact the inner periphery of the track, rollers 53 contact the outer periphery of the track, and rollers 54 contact the top of the track. Thus, the carriage is free to travel about the track from one pivot 18 to the other pivot 17. The mounting member 51 has secured thereto a frame 60 for fastening a gimbal 61 to support the remainder of the earth excavating apparatus of the present invention. The gimbal may best be seen by reference to FIGURE 5 wherein it is shown that the apparatus secured to the gimbal is free to pivot tangentially relative to the periphery of the utility pole about bearings 62 and 63. The apparatus supported by the gimbal may also pivot radially of the utiilty pole by pivoting about bearings 64 and 65.

A hydraulic cylinder 75 is mounted on the gimbal and extends downwardly therefrom. A piston 76 extending downwardly from the cylinder 75 supports an earth scooping arrangement to be described more fully hereinafter. The hydraulic cylinder-piston arrangement may be locked against tangential or radial movement through the utilization of a collar 80 secured to the upper portion of the cylinder and including a tongue 81 having a hole 82 therein which may be registered with a corresponding hole in an extension 83 of the frame 60. When the hole 82 is in registry with the hole in the extension 83, a locking pin may be inserted to thereby lock the portion supported by the gimbal in place; the locking arrangement is convenient for purposes of transporting the earth excavating apparatus of the present invention without endangering the apparatus during transport.

Referring now to the earth scoop portion of the present invention, reference may be had to FIGURES 3 and 4 which most clearly illustrate that portion of the apparatus. A pair of shovels 85 and 86 are mounted for pivotal movement about axes 87 and 88 respectively. The shovels 85 and 86 are forced to pivot about their respective axes through the utilization of a pair of hydraulic cylinders and pistons 90 and 91 respectively. The hydraulic cylinders and pistons are secured between the respective shovels and a cross-brace member secured to the lower end of the piston 76. Thus, when hydraulic fluid is supplied to the hydraulic cylinders 90 and 91 through the conduits 95 and 96, the corresponding pistons are forced outward of said cylinders and the shovels 85 and 86 are pivoted about their respective pivots toward each other. The earth between the respective shovels is thus "scooped" and may be lifted by retracting the piston 76 within the cylinder 75 (FIGURE 1). A reversal of the hydraulic action in the cylinders 90 and 91 causes the shovels 85 and 86 to pivot away from each other thus releasing entrapped earth caught therebetween. To insure that all of the earth formerly scooped by the shovels 85 and 86 is released when the shovels are pivoted away from each other, a pair of wiper plates 100 and 101 are mounted within the corresponding shovels, and remain stationary relative the piston 76. The wiper plates are secured to an extension 105 extending from the lower end 106 of the piston 76.

When the apparatus is in use, the scoop may be lowered and raised by operation of appropriate hydraulic valve (shown generally and schematically at 110) and the scoops may be pivoted toward or away from each other to grasp or release earth therebetween. When a scoop of earth is secured between the respective shovels, and the scoop is raised above the ground level, the scoop may be swung outward past the lip 115 of the excavation by manually pulling on a control arm 120 pivotally connected to the extension 105 as indicated most clearly in FIGURE 4. When the scoop has been swung radially outwardly of the utility pole, the shovels may be pivoted away from each other to thereby release the earth held therebetween, and the scoop then moved radially inwardly once again to collect more earth. The axes about which the respective shovels are pivoted are arranged at an angle as shown in FIGURE 4 to facilitate the removal of a minimum amount of earth from around the periphery of the utility pole while nevertheless exposing the pole for chemical treatment. This angular relationship also results in a horizontal thrust forcing the scoop against the pole when the shovels are pivoted to collect earth. A shoe 92 is provided to abut the pole when this thrust is being transmitted to the pole. The horizontal thrust insures that the earth being removed is immediately adjacent the pole and prevents unnecessary removal of earth remote from the pole surface.

Referring to FIGURE 6, an earth excavating apparatus constructed in accordance with the teachings of the present invention is shown mounted on the back of a small vehicle. The light weight of the apparatus of the present invention enables the apparatus to be boom-mounted without taxing the capacity of light weight vehicles. The vehicle merely positions itself in the vicinity of the pole, and the boom is extended with the track's arcuate portion opened to admit the pole, and the earth excavating apparatus is then attached to the pole for use.

To facilitate the mounting of the present apparatus on a post such as a utility pole, a mounting strap is provided and is secured, such as by welding, to the top surface of the ring. Referring to FIGURE 7, the mounting strap is shown at 150 and, as may be seen by an inspection of FIGURE 7, extends inwardly of the ring 15 and terminates in an eye to receive a hook, steel cable, or other flexible supporting means adapted to lift the apparatus of the present invention. The eye 151, or point of attachment of the strap 150 to the flexible supporting means, is positioned so that with the carriage 50 locked into the position shown in FIGURE 7, the ring 15 is horizontally suspended. Therefore, when the ring is being mounted on the utility pole, and is being supported by the flexible support means such as a chain (152—FIGURE 6) the ring 15 will automatically assume a horizontal position to facilitate the mounting operation and prevent misalignment and subsequent difficulties encountered if the ring were not positioned horizontally before the arcuate portions were locked together.

The operation of the apparatus of the present invention may be described as follows. When the track 15 has appropriately been locked about the periphery of the utility pole, the arm 30 is extended radially inwardly by admitting hydraulic fluid through the conduit 41 to the hydraulic cylinder 32. The shoes 27 subsequently engage the periphery of the utility pole, and firmly grip the pole. Each of the shoes may pivot slightly about the corresponding pivot axis thereby relieving stress that could otherwise cause the arms 25 to break or become damaged if the shoes were positioned non-concentrically about the pole. The locking pin is removed from the pole 82 and the scoop is positioned to begin digging. The shovels 85 and 86 are pivoted about their respective axes away from each other, and hydraulic fluid is admitted to the cylinder 75 to extend the piston 76 downwardly thus causing the shovels to contact the earth. Hydraulic fluid is subsequently admitted to the cylinders 90 and 91 causing the shovels to pivot about their respective axes and scoop earth therebetween. The shovels, with the earth therebetween, are lifted upwardly by reversing the hydraulic fluid flow to the cylinder 75. When the bottom edge of the shovels have cleared the lip 115 of the excavation, the operator may then swing the scoop outwardly away from the excavation and reverse the hydraulic fluid flow to the cylinders 90 and 91. The shovels 85 and 86 are thus pivoted away from each other thereby releasing earth therebetween. In the event that the earth is muddy or consists of heavy clay, wiper plates 100 and 101 insure the release of earth adhering to the respective shovels. The operator may then swing the scoop back into position adjacent the utility pole, and the scoop may be lowered by admitting hydraulic fluid to the cylinder 75. This operation may be carried out completely around the utility pole by moving the carriage 50 on the track 15 until the base of the utility pole is exposed for chemical treatment. Since the carriage 50 cannot travel a complete 360 degrees around the track 15, the gimbal 61 enables the scoop to be swung sideways an amount sufficient to excavate that portion of the earth directly beneath the pivots 17 and 18 of the track 15. An inspection of FIGURE 1 reveals that rollers contacting the inner and outer surfaces of the track 15, and rollers contacting the top edge of the track 15 enable the extensible member comprising the hydraulic cylinder 75 and piston 76 to readily be moved about the utility pole; however, it will also be noted that a space 125 is provided between the bottom surface of the track 15 and the mounting member 51. This space has been provided to enable the carriage to readily be moved about the track 15 for positioning the scoop while nevertheless enabling the carriage to be forced upwardly against the bottom surface of the track when thrusts are transmitted upwardly from the scoop to the track 15. In this manner, the carriage is locked firmly in place during thrust transmission thus preventing the carriage from moving during the scooping operation. The pivots provided for each of the shoes enables each shoe to align itself concentrically with the pole; the arms 25 are thus relieved of any otherwise damaging forces transmitted from the shoe to the track 15.

It will be obvious to those skilled in the art that many modifications may be made in the present invention without departing from the scope thereof. Accordingly, it is intended that the scope of the present invention be limited only by the claims appended hereto.

I claim:
1. A device, for excavating earth from around the base of an earth-embedded post, comprising:
   (a) a detachable track comprising:
       (1) a ring including a pair of arcuate portions hinged to readily open said ring to admit said post and including a locking means for locking arcuate portion in a closed ring position, and
       (2) a plurality of shoes mounted on arms extending radially inwardly of said ring for contacting said post, said shoes being hinged for pivotal movement about an axis parallel to the longitudinal axis of said port, at least one of said arms being movable radially of said ring for effecting a firm grip between said shoes and said post,
   (b) extensible means mounted on, and movable along, said track, and
   (c) earth means secured to said extensible means.
2. A device, for excavating earth from around the base of an earth-embedded post, comprising:
   (a) a detachable track including means for clamping said track to the periphery of said post,
   (b) extensible means mounted on, and movable along, said track, and
   (c) scoop means, secured to said extensible means, comprising:
       (1) a pair opposing shovels mounted for pivotal movement toward and away from each other for scooping earth therebetween when said shovels are pivoted toward each other and for releasing earth therebetween when they are pivoted away from each other,
       (2) hydraulic means for pivoting said shovels, and
       (3) said shovels being pivotal about respective axes arranged at an angle to each other.
3. A device, for excavating earth from around the base of an earth-embedded post, comprising:
   (a) a detachable track including means for clamping said track to the periphery of said post,
   (b) extensible means mounted on, and movable along, said track, and
   (c) scoop means, secured to said extensible means, comprising:
       (1) a pair of opposing shovels mounted for pivotal movement toward and away from each other for scooping earth therebetween when said shovels are pivoted toward each other and for releasing earth therebetween when they are pivoted away from each other,
       (2) hydraulic means for pivoting said shovels,
       (3) said shovels being pivotal about respective axes arranged at an angle to each other, and
       (4) a pair of wiper plates, each positioned within a respective one of said shovels, for forcing earth away from the corresponding shovel when said shovels are pivoted away from each other.
4. A device, for excavating earth from around the base of an earth-embedded post, comprising:
   (a) a detachable track comprising:
       (1) a ring comprising a pair of arcuate portions for ready disassembly to admit said post and including a locking means for locking said arcuate portions in a closed ring position, and
       (2) a plurality of shoes mounted on arms extending radially inwardly of said ring for contacting said post
   (b) extensible means mounted on, and movable along, said track, and
   (c) scoop means, secured to said extensible means, comprising:
       (1) a pair of opposing shovels mounted for pivotal movement toward and away from each other for scooping earth therebetween when said shovels are pivoted toward each other and for releasing earth therebetween when they are pivoted away from each other,
       (2) hydraulic means for pivoting said shovels, and
       (3) said shovels being pivotal about respective axes arranged at an angle to each other.
5. A device, for excavating earth from around the base of an earth-embedded post, comprising:
   (a) a detachable track comprising:
       (1) a ring comprising a pair of arcuate portions for ready disassembly to admit said post and including a locking means for locking said arcuate portions in a closed ring position, and
       (2) a plurality of shoes mounted on arms extending radially inwardly of said ring for contacting said post
   (b) extensible means mounted on, and movable along, said track, and
   (c) scoop means, secured to said extensible means, comprising:
       (1) a pair of opposing shovels mounted for pivotal movement toward and away from each other for scooping earth therebetween when said shovels are pivoted toward each other and for releasing earth therebetween when they are pivoted away from each other,
       (2) hydraulic means for pivoting said shovels,
       (3) said shovels being pivotal about respective axes arranged at an angle to each other, and
       (4) a pair of wiper plates, each positioned within a respective one of said shovels, for forcing earth away from the corresponding shovel when said shovels are pivoted away from each other.
6. A device, for excavating earth from around the base of an earth-embedded post, comprising:
   (a) a detachable track comprising:
       (1) a ring including a pair of arcuate portions hinged to readily open said ring to admit said post and including a locking means for locking arcuate portions in a closed ring position, and
       (2) a plurality of shoes mounted on arms extending radially inwardly of said ring for contacting said post, said shoes being hinged for pivotal movement about an axis parallel to the longitudinal axis of said post, at least one of said arms being movable radially of said ring for effecting a firm grip between said shoes and said post,
   (b) extensible means comprising:
       (1) a hydraulic means including a cylinder and a piston, and
       (2) carriage means mounted for movement along said track, and secured to one end of said hydraulic means,
   (c) scoop means, secured to said extensible means, comprising:
       a pair of opposing shovels mounted for pivotal movement toward and away from each other for scooping earth therebetween when said shovels are pivoted toward each other and for releasing earth therebetween when they are pivoted away from each other.
7. A device, for excavating earth from around the base of an earth-embedded post, comprising:
   (a) a detachable track comprising:
       (1) a ring comprising a pair of arcuate portions for ready disassembly to admit said post and including a locking means for locking said arcuate portions in a closed ring position, and

(2) a plurality of shoes mounted on arms extending radially inwardly of said ring for contacting said post
(b) extensible means comprising:
(1) a hydraulic means including a cylinder and a piston, and
(2) carriage means mounted for movement along said track, and secured to one end of said hydraulic means,
(c) scoop means secured to said extensible means, comprising:
(1) a pair of opposing shovels mounted for pivotal movement toward and away from each other for scooping earth therebetween when said shovels are pivoted toward each other and for releasing earth therebetween when they are pivoted away from each other,
(2) said shovels being pivotal about respective axes ranged at an angle to each other.

8. A device, for excavating earth from around the base of an earth-embedded post, comprising:
(a) a detachable track comprising:
(1) a ring comprising a pair of arcuate portions for ready disassembly to admit said post and including a locking means for locking said arcuate portions in a closed ring position, and
(2) a plurality of shoes mounted on arms extending radially inwardly of said ring for contacting said post,
(b) extensible means comprising:
(1) a hydraulic means including a cylinder and a piston, and
(2) carriage means mounted for movement along said track, and secured to one end of said hydraulic means,
(c) scoop means, secured to said extensible means, comprising:
(1) a pair of opposing shovels mounted for pivotal movement toward and away from each other for scooping earth therebetween when said shovels are pivoted toward each other and for releasing earth therebetween when they are pivoted away from each other,
(2) hydraulic means for pivoting said shovels,
(3) said shovels being pivotal about respective axes arranged at an angle to each other, and
(4) a pair of wiper plates, each positioned within a respective one of said shovels, for forcing earth away from the corresponding shovel when said shovels are pivoted away from each other.

9. A device, for excavating earth from around the base of an earth-embedded post, comprising:
(a) a detachable track comprising:
(1) a ring comprising a pair of arcuate portions hinged to readily open said ring to admit said post and including a locking means for locking arcuate portion in a closed ring position, and
(2) a plurality of shoes mounted on arms extending radially inwardly of said ring for contacting said post, said shoes being hinged for pivotal movement about an axis parallel to the longitudinal axis of said post,
(b) extensible means comprising:
(1) a hydraulic means including a cylinder and a piston, and
(2) carriage means mounted for movement along said track, and secured to one end of said hydraulic means,
(c) scoop means, secured to said extensible means, comprising:
(1) a pair of opposing shovels mounted for pivotal movement toward and away from each other for scooping earth therebetween when said shovels are pivoted toward each other and for releasing earth therebetween when they are pivoted away from each other,
(2) hydraulic means for pivoting said shovels,
(3) said shovels being piovtal about respective axes arranged at an angle to each other, and
(4) a pair of wiper plates, each positioned within a respective one of said shovels, for forcing earth away from the corresponding shovel when said shovels are pivoted away from each other.

References Cited

UNITED STATES PATENTS

| | | | |
|---|---|---|---|
| 1,073,325 | 9/1913 | Brown | 172—24 |
| 2,731,163 | 1/1956 | Wills et al. | 37—186 X |
| 2,770,057 | 11/1956 | Camp | 37—103 |
| 2,863,258 | 12/1958 | Gish | 37—2 |

FOREIGN PATENTS

| | | |
|---|---|---|
| 488,751 | 7/1938 | Great Britain. |

ABRAHAM G. STONE, *Primary Examiner.*

WILLIAM A. SMITH III, *Examiner.*